UNITED STATES PATENT OFFICE.

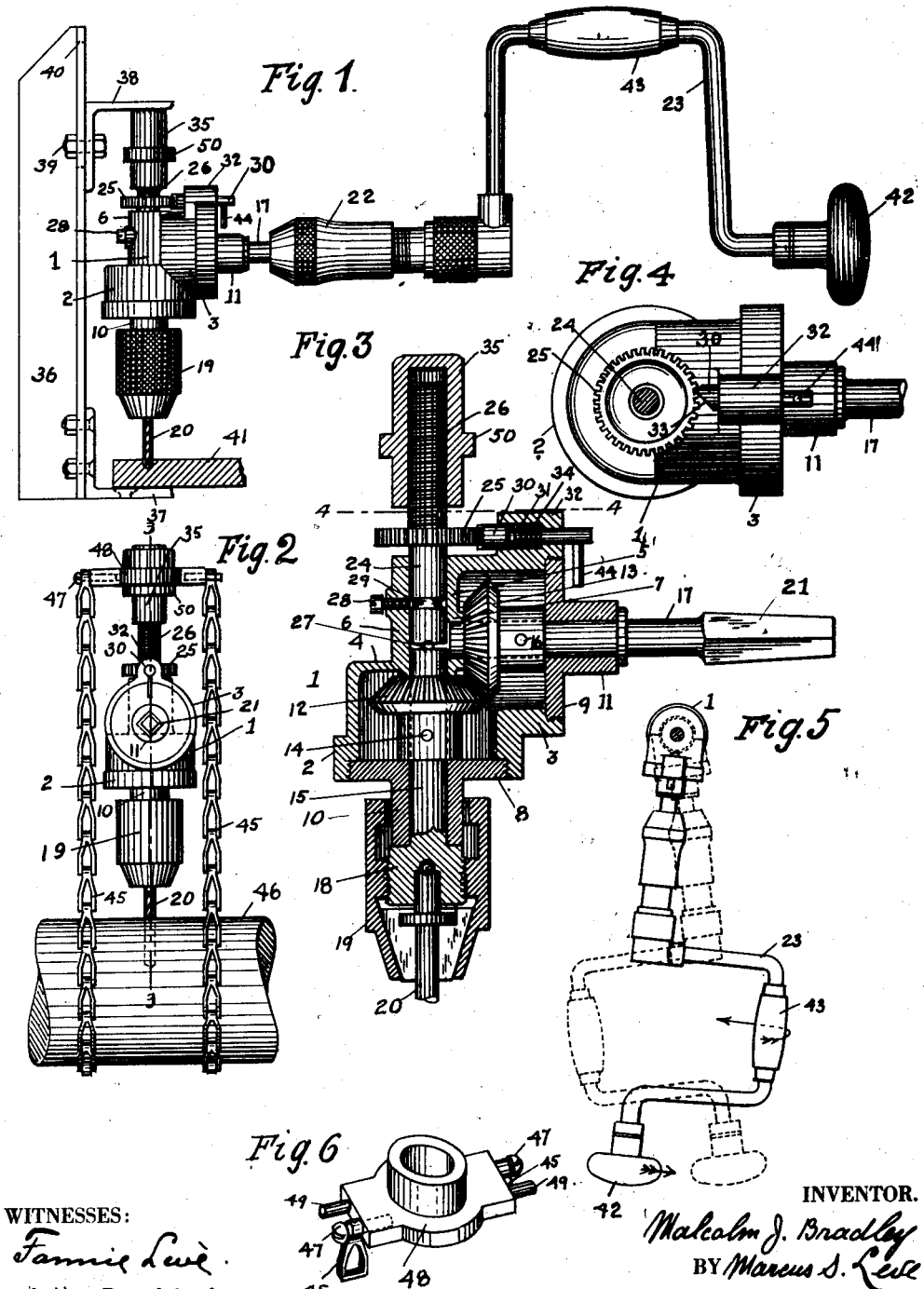

MALCOLM J. BRADLEY, OF OAKLAND, CALIFORNIA.

PORTABLE DRILL-PRESS.

1,335,154.  Specification of Letters Patent.  Patented Mar. 30, 1920.

Application filed July 5, 1918. Serial No. 243,295.

*To all whom it may concern:*

Be it known that I, MALCOLM J. BRADLEY, a citizen of the United States, residing at Oakland, in the county of Alameda and State of California, have invented new and useful Improvements in Portable Drill-Presses, of which the following is a specification.

My invention relates to improvements in portable drills used for drilling holes in a piece of work which can not conveniently be brought under a stationary drill press, and the object of my invention is to provide convenient means for turning the drill whereby the rapidity of the drilling is increased and to furnish efficient means for feeding the drill toward the work without interruption of the operation of the drilling.

The further object of the invention is to provide a portable drill press for the purpose set forth which is compact and simple in its construction, efficient in its use, and comparatively inexpensive in manufacture.

With the foregoing in view the invention consists of the novel construction, combination and arrangement of parts as hereinafter described and illustrated in the accompanying drawings in which—

Figure 1 is a side elevation of the portable drill showing the same in operation when held in a rigid frame.

Fig. 2 is a front elevation of the drill showing the device held to the work by chains.

Fig. 3 is a vertical section through the center of the drill press taken on line 3—3 of Fig. 2 and drawn to a larger scale.

Fig. 4 is a sectional plan taken on line 4—4 of Fig. 3 showing the ratchet actuating the feeding of the drill during the operation of drilling.

Fig. 5 is a plan of the device drawn to a smaller scale showing the manipulation of the operating brace for turning the drill and at the same time feeding the same to the work, and Fig. 6 is a perspective view of the yoke.

The drill press consists of the cast body 1 formed in the shape of two cylindrical caps 2 and 3 cast together and arranged at right angles one to the other.

The heads 4 and 5 of said caps are provided with the bearings 6 and 7 and the open ends which are formed with screw threads are closed by the plugs 8 and 9 carrying the bearings 10 and 11.

A bevel gear 12 is placed within the cap 2 and is made to mesh with a similar bevel gear 13 placed within the cap 3.

The said gear 12 is secured by means of a pin 14 to the spindle 15 of the drill press which is resting at one end in the lower portion of the bearing 6 and at the other end in the bearing 10; while the gear 13 is secured by means of the pin 16 to the driving shaft 17, working in the bearings 7 and 11.

The lower end 18 of the spindle 15 is enlarged in diameter and is provided with a screw thread to receive the drill chuck 19 carrying the drill 20, while the driving shaft 17 is formed at the outer end with a square shank 21 whereby it becomes engaged by the chuck 22 at the end of an ordinary carpenter's brace 23, which serves the double purpose of turning the drill and of feeding the same toward the work.

A feed stem 24 carrying integral with it a ratchet wheel 25 and furnished at the upper end with a screw thread 26 is fitted to turn at its lower end in the upper portion of the bearing 6 resting at the bottom upon a ball bearing 27 placed within a cavity at the top of the drill spindle 15 and is held in place by a screw 28 engaging an annular groove 29 cut in said stem.

A ratchet pin 30 fitted to slide in a hole 31 bored through a lug 32 provided upon the cast body 1 of the drill press is furnished with a beveled end 33 engaging the teeth of the ratchet wheel 25 when being moved in one direction, thus causing the rotation of said wheel together with the feed stem 24, and sliding over the teeth when moved in the opposite direction.

A spring 34 is provided for keeping the pin 30 against the ratchet wheel.

A sleeve 35 threaded in the inside is fitted upon the screw thread 26 of the feed stem.

The portable drill press may be secured to the work in various ways in the same manner as an ordinary ratchet drill.

In Fig. 1 the drill is shown to be held in a frame comprising an upright member 36 formed of a piece of T iron which is secured to a foot member 37 made of a piece of angle iron and carrying at the top an adjustable arm 38 which is here represented by a piece of angle iron held upon the upright member by bolts 39 passing through the slots 40.

The article to be drilled represented by a plate 41 is shown resting upon the foot member 37 the drill press is placed within the frame in an upright position, the drill 20 resting upon the work and the sleeve 35 abutting against the adjustable arm 38 of the frame.

The driving shaft 17 being in a horizontal position and clamped firm by the carpenter brace forms a single rigid arm which is free to swing together with the cast frame 1 in a horizontal plane with the center line of the drill as a center, and at the same time capable to turn within the bearings 7 and 11 of said cast frame.

The drill is operated by turning the crank 43 with the right hand, controlling at the same time the rigid arm formed by the driving shaft and the carpenter brace by holding the plate 42 with the left hand.

The turning of the crank 43 together with the driving shaft 17 actuates the drill 20 through the medium of the bevel gears 13 and 12.

In order to feed the drill to the work as the operation of the drilling continues, the plate 42 of the carpenter brace is oscillated horizontally, thus causing the oscillation of the cast body 1 of the drill together with the ratchet pin 30.

The said ratchet pin 30 engaging the ratchet wheel 25 turns it together with the feed stem 26 withdrawing the latter from within the sleeve 35, (which is prevented from turning by friction of its upper surface against the adjustable arm 38) and causing the drill to be fed toward the work.

In practice the crank 43 is turned clockwise, and while being moved for a half of a revolution toward the left by the right hand the plate 42 of the brace is moved toward the right by the left hand, as shown by the arrows in Fig. 5; and for the remaining part of the revolution the crank 43 is being moved toward the right and the plate 42 toward the left. Both hands of the operator are thus being moved in the opposite directions one from the other while making both the first and the last half turns, which is the most natural and convenient way for rapid and efficient operation.

For withdrawing the drill, the feed stem 24 is made to turn in the opposite direction by giving the ratchet pin 30 a half a turn within the hole 31.

The beveled end 33 of the ratchet pin becomes reversed and causes the driving of the ratchet wheel in the opposite direction.

A pin or arm 44 is provided upon the ratchet pin 30 whereby the latter may be turned in one or in the other direction.

In Fig. 3 the drill press is shown to be held to the work by means of chains 45. The piece of work to be drilled is here represented in the shape of a shaft 46.

The chains are secured at one end to screws 47 provided at the ends of a yoke 48 and passing around the shaft are returned back to the yoke where they become clamped between the screws 47 and the pins 49.

The yoke is fitted around the upper portion of the sleeve 35 resting upon a shoulder 50 provided upon said sleeve.

The operation of the drill press remains the same, the rotation of the drill is accomplished by the turning of the crank of the brace, while the feeding of the drill toward the work is done by oscillating the cast body 1 in a horizontal plane by oscillating the rigid arm formed by the driving shaft 17 and the carpenter brace.

Having thus described my invention what I claim as new and desire to secure by Letters Patent is:

1. In a device of the character described the combination of a drill body, a drill spindle mounted in an upper and in a lower bearing upon said drill body, a feed screw mounted within said upper bearing, and means for imparting a continuous rotary motion to said drill spindle and an intermittent rotary motion to said feed screw comprising a driving shaft mounted in bearings at right angles to said drill spindle adapted to receive a rotary motion within said bearings and an oscillatory motion around said drill spindle, bevel gears connecting said driving shaft and said drill spindle transmitting the rotary motion of the former to the latter, and a ratchet wheel secured to said feed screw and driven by a ratchet pin carried upon said drill body imparting an intermittent rotary motion to the feed screw by the oscillatory motion of the driving shaft.

2. In a device of the character described the combination of a drill body, a drill spindle mounted in an upper and in a lower bearing upon said drill body, a feed screw mounted within said upper bearing, and means for imparting a continuous rotary motion to said drill spindle and an intermittent rotary motion to said feed screw comprising a driving shaft mounted in bearings at right angles to said drill spindle, a brace rigidly clamped to said driving shaft adapted to impart to said shaft a rotary motion within its bearings and an oscillatory motion around the drill spindle, bevel gears connecting said driving shaft and said drill spindle transmitting the rotary motion of the former to the latter, and a ratchet wheel secured to said feed screw and driven by a ratchet pin carried upon said drill body imparting an intermittent rotary motion to the feed screw by the oscillatory motion of the driving shaft.

M. J. BRADLEY.

Witnesses:
 W. T. NEWBY,
 H. H. SELLERS.